March 6, 1945.   F. M. CROWE   2,370,638
HOLLOW PRECAST BUILDING SLAB AND METHOD OF MANUFACTURE
Filed Aug. 22, 1941   6 Sheets-Sheet 1
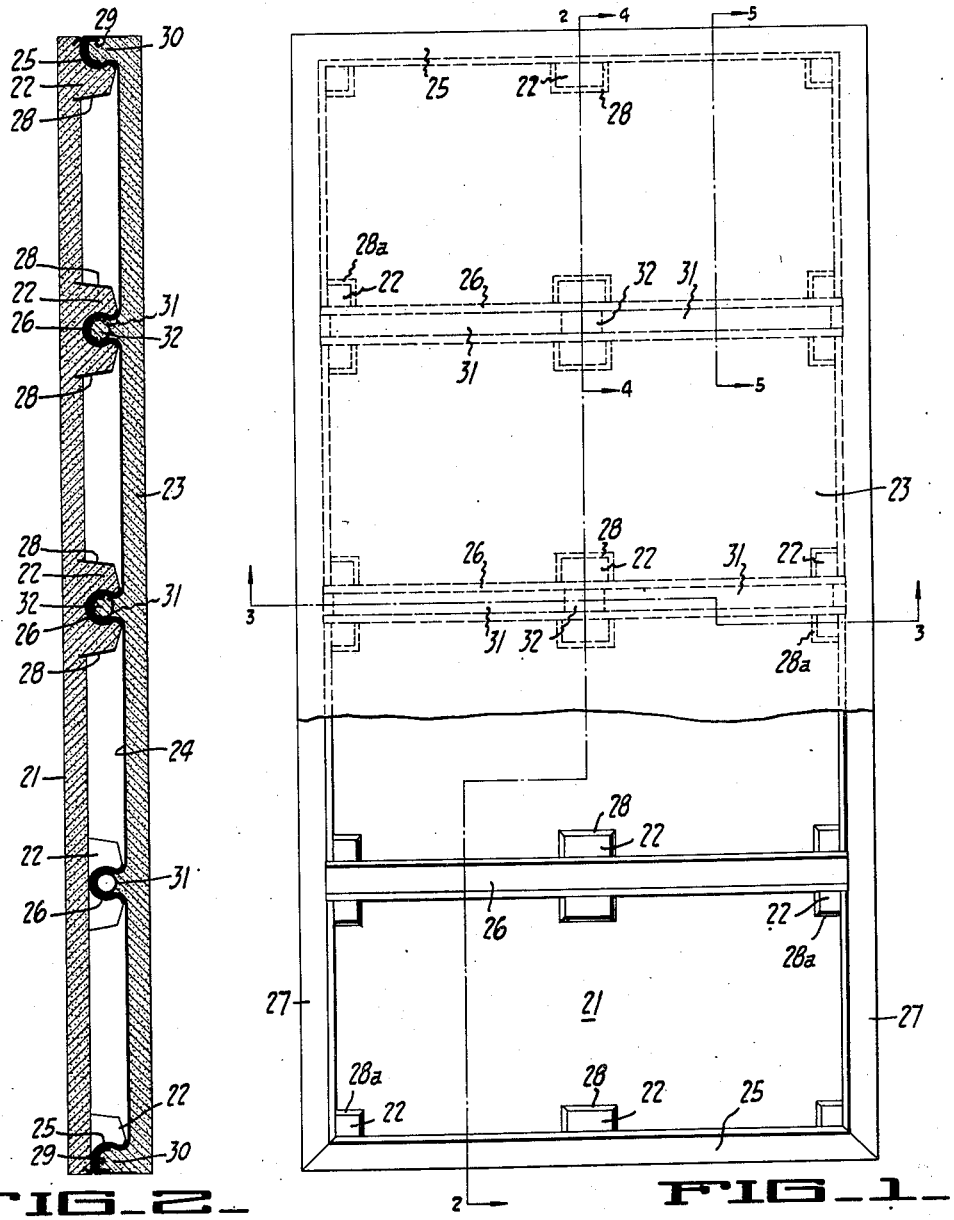
FIG_2_   FIG_1_
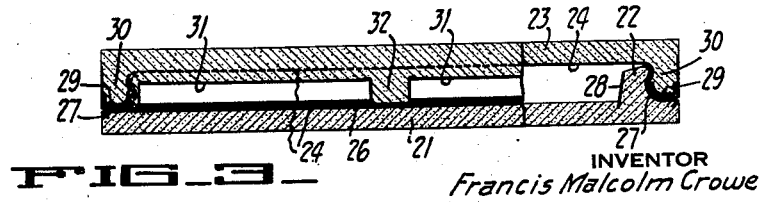
FIG_3_
INVENTOR
Francis Malcolm Crowe
BY
ATTORNEY March 6, 1945.  F. M. CROWE  2,370,638
HOLLOW PRECAST BUILDING SLAB AND METHOD OF MANUFACTURE
Filed Aug. 22, 1941  6 Sheets-Sheet 2
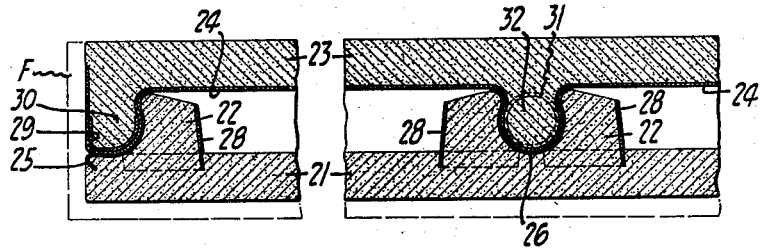
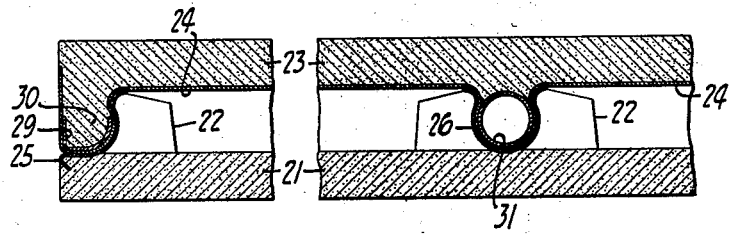
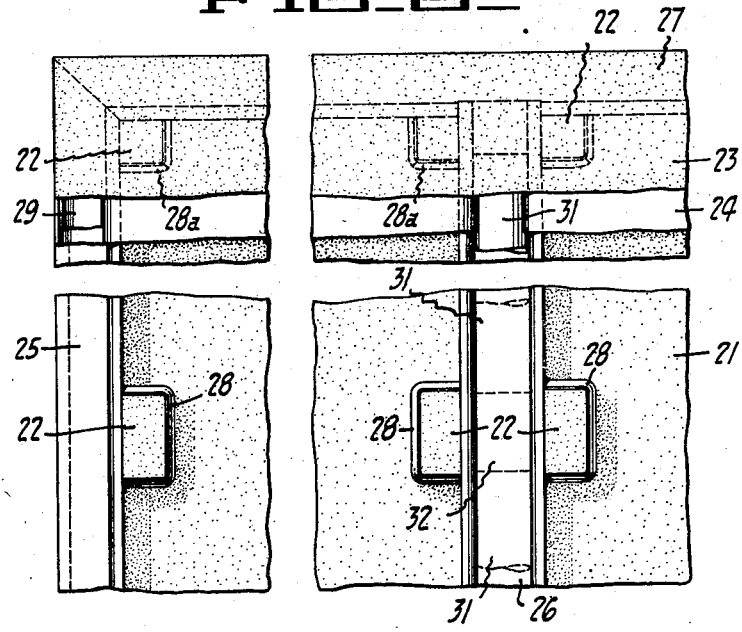
INVENTOR
Francis Malcolm Crowe
BY
ATTORNEY March 6, 1945.  F. M. CROWE  2,370,638
HOLLOW PRECAST BUILDING SLAB AND METHOD OF MANUFACTURE
Filed Aug. 22, 1941  6 Sheets-Sheet 3
FIG-7-
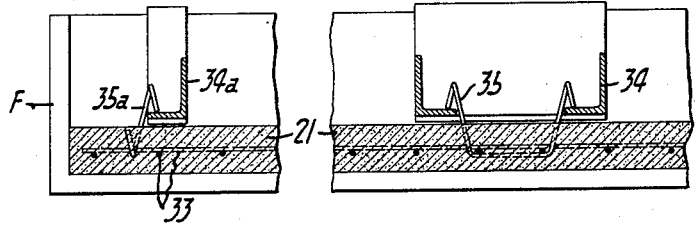
FIG-8-
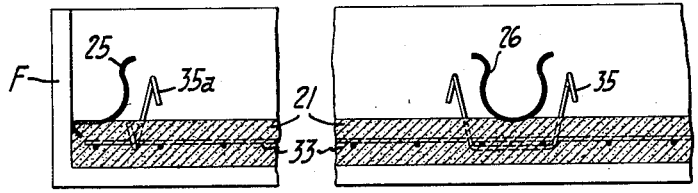
FIG-9-
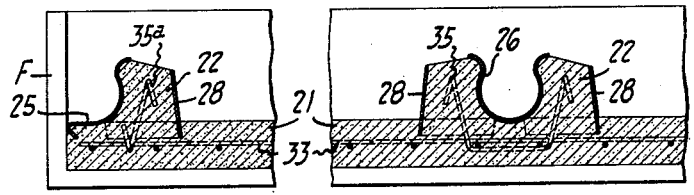
FIG-10-
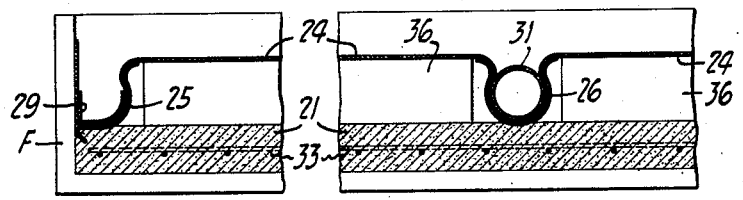
FIG-11-
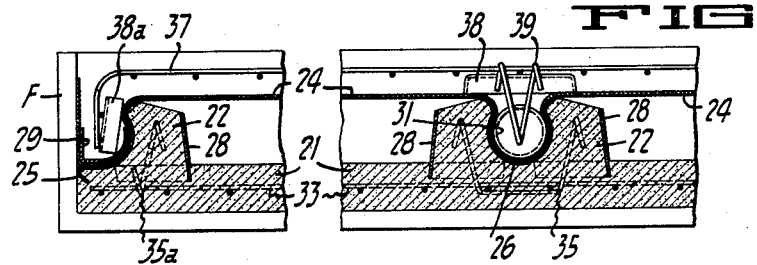
INVENTOR
Francis Malcolm Crowe
BY
ATTORNEY March 6, 1945. F. M. CROWE 2,370,638
HOLLOW PRECAST BUILDING SLAB AND METHOD OF MANUFACTURE
Filed Aug. 22, 1941 6 Sheets-Sheet 4

INVENTOR
Francis Malcolm Crowe
BY
ATTORNEY

March 6, 1945.　　　F. M. CROWE　　　2,370,638
HOLLOW PRECAST BUILDING SLAB AND METHOD OF MANUFACTURE
Filed Aug. 22, 1941　　　6 Sheets-Sheet 5
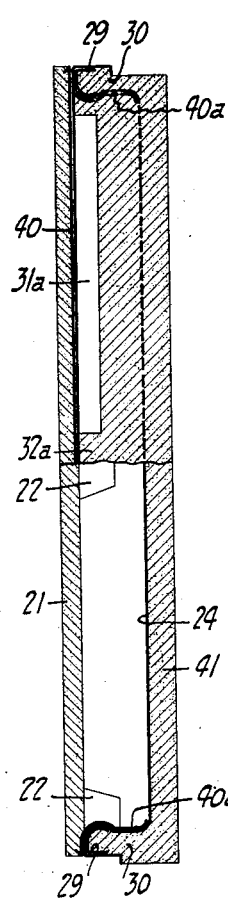
FIG_14_
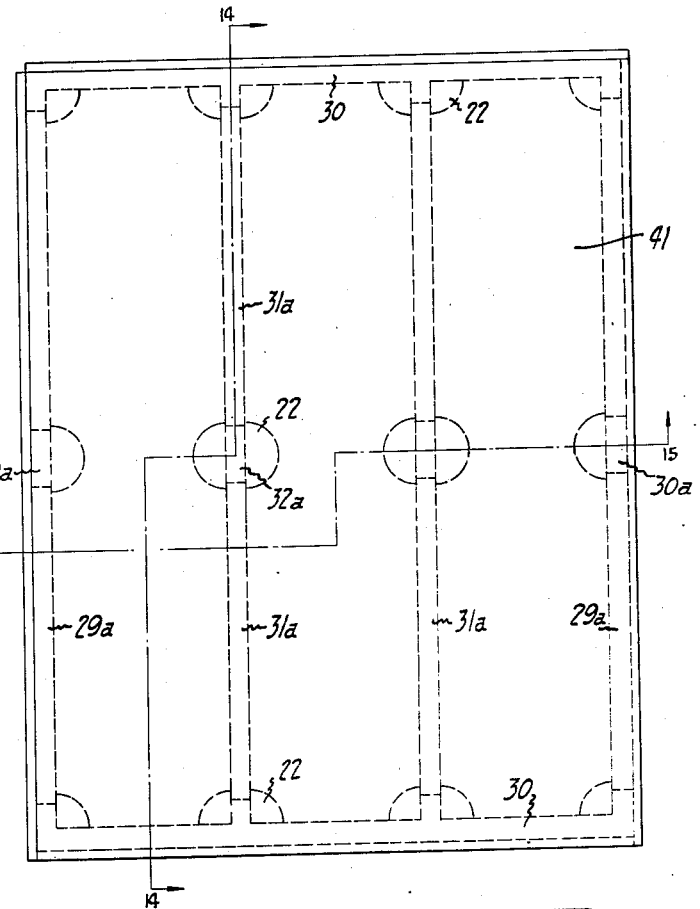
FIG_13_
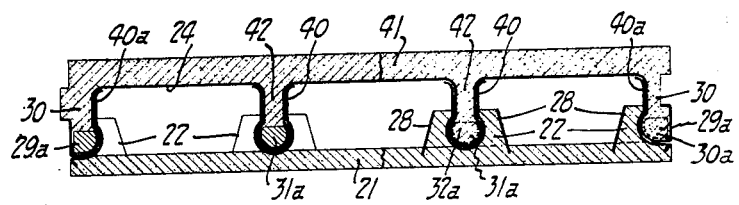
FIG_15_
INVENTOR
Francis Malcolm Crowe
BY
ATTORNEY March 6, 1945.  F. M. CROWE  2,370,638
HOLLOW PRECAST BUILDING SLAB AND METHOD OF MANUFACTURE
Filed Aug. 22, 1941  6 Sheets-Sheet 6
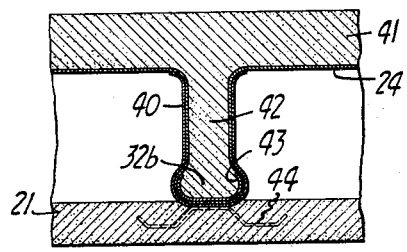
FIG_16_
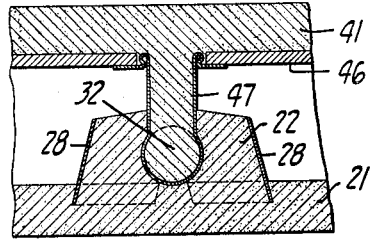
FIG_18_
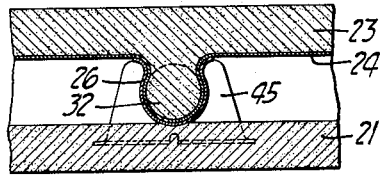
FIG_17_
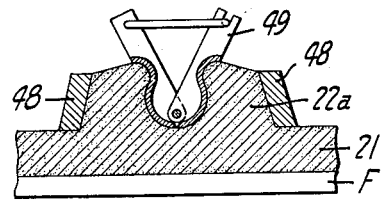
FIG_19_
FIG_21_
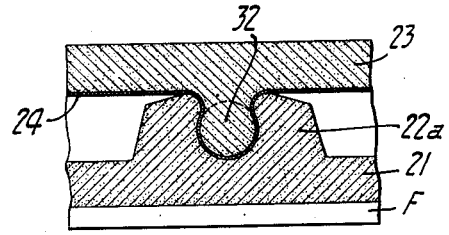
FIG_20_
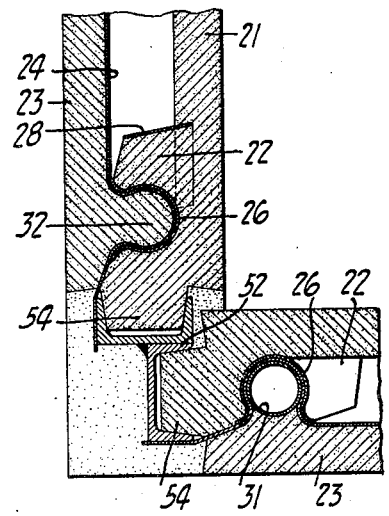
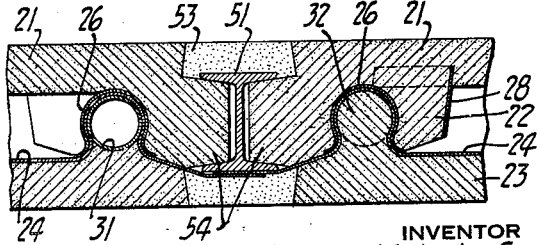
INVENTOR
Francis Malcolm Crowe
BY
ATTORNEY Patented Mar. 6, 1945

2,370,638

UNITED STATES PATENT OFFICE 2,370,638

HOLLOW PRECAST BUILDING SLAB AND METHOD OF MANUFACTURE

Francis Malcolm Crowe, Burlingame, Calif.

Application August 22, 1941, Serial No. 407,930

12 Claims. (Cl. 25—155)

This invention relates generally to hollow precast concrete slabs for use in buildings of various types, notably for use in either bearing or curtain walls, in partitions and in roof and floor decks. More specifically, this invention relates to the method and means whereby such hollow units can be manufactured economically and to certain features which characterize the resulting product.

Since the relative importance of these features varies depending upon the use for which the slabs are intended, it is impossible to arrange the objects of this invention in the order of their importance. One objective is to device an economical means for precasting concrete slabs which are more truly hollow than are the conventional cellular or "cored slabs" or the so-called "hollow building blocks." In effect this invention provides a building unit comprising two thin surface slabs connected by "interior columns" rather than by the "interior walls" which may be said to characterize the present "hollow building blocks."

In this invention, the sum of the cross-sectional areas of these "interior columns" connecting the two surface slab-layers usually will be less than five percent of the total area of the slab unit whereas the conventional "cored slabs" and so-called "hollow building blocks" are solid between surfaces for more than thirty percent of their area. This difference results not only in a much lighter weight building unit but also in one possessing better insulating qualities. Whereas most of the heat transmission thru such conventional type units is by conduction thru the solid web portions, in this invention the hollow interior of the slab-unit serves as air-space insulation, the effectiveness of which is reduced only slightly by conduction thru the drastically reduced area of the solid connecting portions.

The lighter weight characterizing slabs that embody this invention is also important. It either makes possible easier and faster installation of building units of the same sizes as now prevailing or permits use of fewer units of larger size, in either case resulting in reduction of building cost. Another advantage attending lighter weight is the saving made possible in the structural frame required to support roof and floor decks and curtain walls and partitions composed of such units.

It is also an object of this invention to provide a substantially continuous waterproof membrane interposed between the two surfaces of the slab-unit. That such a membrane be continuous necessitates that the aforementioned "interior columns" connecting the two surface layers shall be integral with only one of the layers and shall depend upon a mechanical interlock for adherence to the opposed layer, with the membrane incorporated into such interlocks as will be hereinafter explained.

Inclusion of such a membrane within a slab-unit makes it possible to reduce or to entirely eliminate surface coatings used primarily to waterproof a wall. Moreover, such a membrane, coupled with means for making waterproof joints between adjacent slabs, furnishes a positive and foolproof assurance of moistureproofness which is essential in a satisfactory exterior wall construction. It is noteworthy that this protection is independent of the thickness of the slab-units used.

Of greatest practical importance and in order that the cost of manufacturing slab-units of the type described herein shall be minimized, it is a further object of this invention to devise means whereby all precasting and other operations involved in the manufacture of such units shall be performed progressively from one surface; that is, that there shall be no necessity to reverse a partially complete slab in order to pour the remaining layer from the opposite side of a centrally located membrane. The latter procedure would be objectionable not only because of the extra handling of the form and incomplete unit therein but also because of the delay of several days required for the initial pour to attain the strength sufficient to withstand such movement.

Further objects of the invention will appear from the following description in which the preferred embodiments of the invention have been set forth in detail in conjunction with the accompanying drawings. It is to be understood that the appended claims are to be accorded a range of equivalents consistent with the state of the prior art.

Referring to the drawings:

Fig. 1 is a plan view of a slab-unit embodying this invention, partly cut-away and shown in the horizontal position occupied during its manufacture.

Figs. 2 and 3 are cross-sectional views taken along the lines 2—2 and 3—3 respectively of Fig. 1.

Figs. 4 and 5 are enlarged cross-sectional views taken along the lines 4—4 and 5—5 respectively of Fig. 1.

Fig. 6 is an enlarged partial plan view, broken away to disclose the inner construction of the slab-unit.

Figs. 7 to 11 inclusive are enlarged partial cross-sections showing certain progressive stages in the manufacture of such a slab-unit and show also an end and the bottom of the form used therein.

Fig. 13 is a plan view of a slab-unit so modified as to have stiffening ribs.

Figure 12:
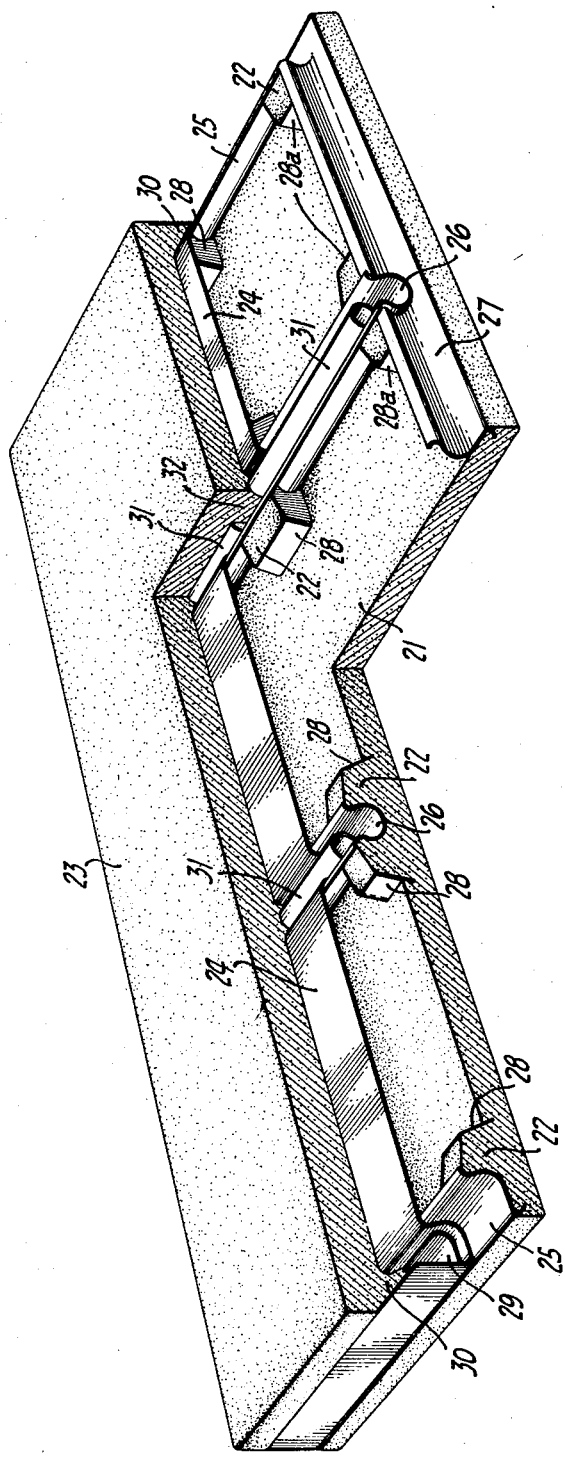
Fig. 12 is a cut-away perspective view of a similar slab-unit embodying the invention.

Figs. 14 and 15 are cross-sectional views taken along the lines 14—14 and 15—15 respectively of Fig. 13.

Figs. 16, 17 and 18 are enlarged cross-sectional views showing certain modifications of the invention.

Figs. 19 and 20 are enlarged cross-sectional views showing two stages in the manufacture of another modified form of the invention.

Fig. 21 is a horizontal cross-section of a wall and shows a special usage of one type of slab-unit.

Since most of the advantages possessed by hollow precast slab-units embodying this invention, particularly their low cost and practicability, are dependent upon the method and means employed in their manufacture, these said means which may be termed "accessories" will be first described.

Referring to Figs. 2 and 3, cross-sections of the slab-unit shown in Fig. 1, or to Fig. 12, a cut-away view of a unit typifying this invention, it will be seen that the slab-unit consists of two distinct portions, a bottom element 21 which comprises the flat initially poured surface layer augmented by certain internally projecting abutments 22 that are integral therewith, and a top element 23 which is poured later and encloses hollow interior space, this top element having integral projections 32 which interlock with the aforementioned abutments of the bottom element. The dome-like character of this top element is due to it having been poured over an interior formwork constituted by the membrane 24, supported above the bottom element 21 primarily by edge forming members 25 at slab ends and by trough members 26 parallel thereto and spaced at intervals between same. Additional edge forming members 27 may be positioned along slab sides, each side either having a single piece that is notched out at intersections therewith of trough members 26 or having a series of short pieces extending between ends of trough members and to meet the end edge forming members.

The so-called trough members 26 may be of sheet metal formed into a bulbous U-shape cross-section such that a circular shape would be confined at and within the bottom thereof and with outwardly curved top ends to avoid cutting into the membrane which passes thereover, this shape being more clearly shown enlarged in Fig. 8. Similarly the edge forming members 25 and 27 may approximate one-half of a trough member in cross-section, possibly having an extended horizontal bottom flange with a return lip as shown in the same view.

Edge forming members 25 and 27 and trough members 26 are secured to the bottom element by the aforementioned abutments 22 located at corner intersections of edge forming members, on both sides of intersections of trough members with side edge forming members, and as required by slab width at intervals along the end edge forming members and in pairs along trough members. Formation of such abutments requires use of small sheet metal forms, L-shaped in plan for location at intersections and U-shaped in plan for location at intervals along said end and interior members, such abutment forms, 28 and 28a in the several views, having vertical edges shaped to fit and placed against edge forming and trough members, having bottom edges pushed into and embedded in the initial pour of the bottom element and with the interior thereof filled with the same material as the flat surface layer and made integral therewith to comprise the bottom element. In order to avoid contact with the top element, the top of such abutments and forms for same may slope downward as shown in the several views.

Junctures of end and side edge forming members 25 and 27 at slab corners and of trough members 26 with side edge forming members 27 need only be sufficiently tight to serve as part of the forms for abutments 22 occurring thereat. Such junctures may be neatly cut for a tight fit, one of the two intersecting members butting against the other, the latter extending slightly beyond what would be a mitred intersection; may be cut with squared ends and have a small vertical liner form on the inside of such intersection; or may be cut short and be lapped against mitred intersection pieces. A fourth alternative is use of four-sided abutment forms, the outer sides being shaped to match the curvature of edge forming and trough members which would be cut short and lapped against same.

The membrane 24 is bent down over the edge forming member 25 at slab ends and is made to lie flat against the bottom thereof by a sheet metal binder strip 29 which is shaped to fit the bottom of the groove established between the upstanding leg of the edge forming member 25 and the vertical end of the slab form, the said binder strip being sufficiently rigid to anchor the said membrane therein by spring action. When the top element is poured, a downwardly projecting integral lip 30 is formed along each slab end and encloses the hollow interior thereat.

Similarly the membrane 24 is depressed into the interior of each trough member 26, serpentine fashion, and is held therein by one of several means. One such means, denoted 31a in Fig. 15, is the trough filler consisting of lengths of wood, round in cross-section except that same is planed off so as to have one flat side, the principal diameter being such as to fill the inside of the trough member at the rounded bottom thereof and the shortened diameter to the flat side being less than the width of the upper necked portion of said trough member. This type of trough filler is lowered into the trough with the flat side held vertical and then is rotated ninety degrees bringing the flat side uppermost, the filler in this position holding the membrane tightly against the inner surface of the trough member and filling the lower portion thereof.

An alternate type of trough filler, denoted 31 in various other views, consists of lengths of cardboard tubing, each with both ends closed by flexible diaphragms such that the tube may be squeezed to an oval shape for insertion thru the narrowed opening at the top of a trough member, after which same will spring back to its normal round cross-section and perform the same functions as described above. This type of trough filler may be preferred when maximum insulation is desired. Still another means of retaining the membrane within trough members will be described later.

With either of the types described, trough fillers are in short lengths such that same will be spaced apart at those points within the trough member opposite which abutments 22 occur. Thus when the top element is poured, material comprising same flows into such unfilled spaces between ends of adjacent aligned trough fillers so as to form disk-like projections 32, protruding downward from the under surface of said top element 23 and integral therewith and bearing against the membrane 24 lining the inner surface of trough members 26. Such disk-like projections effectively interlock with the abutments 22 projecting upward from the bottom element, being separated therefrom only by the single thickness of membrane and the metal comprising the trough member.

As at slab ends, the membrane 24 may be bent down over the edge forming members 27 along slab sides into the groove space between the upstanding leg of said members and the vertical side of the slab form. It will be necessary to make folds in the membrane at slab corners and where trough members 26 meet the side edge forming members 27 in order to make the membrane lie as flat as possible against the bottom of said grooves, after which it is held therein by binder strips 29 similar to those used at slab ends. Thus as at slab ends, the top element may have integrally poured downstanding lips 30 along slab sides, enclosing the interior hollow space and completing the dome-like character of the said top element 23. A more important function of these side downstanding lips will be disclosed presently.

In considering the interlocking action of the abutments 22, integral with and projecting upward from the bottom element 21, with the side and end lips 30 and the interior disk-like projections 32, all integral with and projecting downward from the top element 23, it is obvious from Figs. 2 and 3, or from Fig. 12, that the two elements cannot be separated by pulling apart, one from the other, so long as such abutments, lips and projections are intact.

In addition, it should be observed in Figs. 2 or 12 that contact between substantially vertical bearing surfaces of abutments 22 and inner faces of the end lips 30, and between abutments and trough space projections 32, prevents longitudinal slippage of one element with respect to the other. Similarly in Fig. 3 or 12, contact between abutments 22 and the inner faces of side lips 30 prevents transverse slippage. Such three-directional interlock in a laminated precast slab-unit, having a continuous membrane interposed between laminations, can be accomplished only by special means and it is believed that this invention offers the first entirely practical and economical means for this purpose.

In all of the foregoing description and in the discussion of progressive steps of slab manufacture which follows, the terms "top" and "bottom" in designating the two principal elements of the slab refer to the position thereof during the pouring process and while in the form. Obviously the completed slab-unit may be installed in a building in various positions and, in many cases, it makes no difference as to which way the slab may be faced.

Ease and economy in manufacturing the described slab-units are features of this invention. This can be properly appreciated only with a full understanding of the successive operations during such manufacture, various progressive stages of which are shown in the several sectional views Figs. 7 to 11 inclusive. Use of metallic reinforcement in both slab elements, while not essential, is highly desirable and placement thereof is inclued in the description of operations to follow.

Using a rectangular form, denoted F in Figs. 7 to 11, horizontally positioned and having a flat bottom and sides and ends of proper height and shape, reinforcement 33 for the bottom element is laid therein, preferably wire fabric; temporary support beams 34 and 34a are placed across the form, approximately above the center of each desired row of abutments; wire stirrups 35 and 35a, having hooked top ends, are so positioned at each desired abutment location as to suspend the sheet of reinforcement above the form at a height approximating half the layer thickness of the bottom element, the vertical stems of such stirrups approximating the centers of the abutments and the top hooks thereof engaging the said support beams; and the main layer of concrete, or similar material, comprising the bottom element 21 is poured and roughly leveled to the desired uniform thickness. This stage of manufacture is shown in the sectional view Fig. 7.

Continuing operations before such initial pour of concrete has begun to set, the temporary support beams are removed, concrete having sufficient buoyancy so that the reinforcement and stirrups will not sink therein appreciably; the end edge forming members 25 are positioned at slab ends as shown in Fig. 8 and the trough members 26 are positioned parallel thereto and at desired intervals between same and the side edge forming members 27 are fitted, similar in position to the end members, all resting upon the top surface of the initial pour or upon spacers as will be explained hereinafter and except that when edge forming members have a return lip, same will be depressed into the wet concrete; abutment forms 28 and 28a are next positioned, forcing bottom ends thereof into the wet concrete and adjusting the projecting stirrup ends so as to be roughly centered in such abutment forms; and the abutment forms are packed with concrete or material similar to the initial pour, care being taken to insure completeness of filling same and of bonding with the initial flat pour, such integral abutments being designated 22 in Fig. 9 which illustrates completion of the bottom element.

At this point further operations are delayed sufficiently for the material comprising the bottom element to take its initial set, that is, to harden but not necessarily to cure completely. Before undertaking placement of the membrane, it will generally be desirable to install one or more rows of interior supports for same extending at right angles to and between the several trough members 26 and end edge forming members 25. Such supports, which may be termed "sag relievers," may consist of lengths of wood, denoted 36 in Fig. 10, of cardboard tubing or or other suitable alternative such as lengths of sheet metal formed into an inverted V-section, and will rest upon the top surface of the flat bottom element 21, being of such height that the top thereof will be level with tops of trough and edge forming members.

The membrane, designated 24 in the several views, usually will be of a waterproof paper that is strong and relatively flexible such as, for example, the building paper known commercially as "Sisalkraft." For utmost convenience, it may be precut into sheets of proper size for each slab, spliced with cemented lap where necessary. The membrane is installed by first securing same at one end, fitting the previously described binder strip 29 into the bottom of the groove between form end and the upstanding leg of the edge forming member 25; the membrane is then stretched taut to the nearest trough member 26, is depressed into the interior of same and secured therein with the necessary number of trough fillers 31, care being taken that the latter are properly spaced apart opposite locations of abutments 22; this operation is repeated at each successive trough member until the opposite end is reached, where the membrane is secured with another binder strip 29; the side edges of the membrane are now bent down over the side edge forming members 27, making the necessary folds, or pleats, at corners and at trough points, after which binder strips 29 are snapped into the side grooves similar to those at slab ends. Fig. 10 shows this stage of operations completed, this sectional view being taken along a line removed from the abutments.

Reinforcement 37 for the top element 23 is laid over the membrane 24, is raised above same to a height approximating half the thickness of the top slab element by inserting chairs 38 between same at intervals along trough points, such chairs being short lengths of sheet metal of inverted V-section or other alternative; the reinforcement 37 also may be bent downward into the grooves along end and side forms and be spaced therein by chairs 38a to reinforce the lips 30 which are to be formed therein; bent wire loops 39 may be positioned at each unfilled space along the trough members 26 to reinforce the disk-like projections 32 which are to be formed therein. Fig. 11 shows these operations complete.

Concrete, or similar material, comprising the top element 23 is now poured, it being desirable first to fill and tamp the end and side lips 30 and the trough space projections 32 and secondly to pour the material thereover, spreading same somewhat gently outward therefrom to cover the membrane 24 as this procedure will obviate loosening of said membrane and will minimize sag thereof. It will be convenient to have sides and ends of the form F correspond in height to total slab-unit thickness so that the upper surface of the top element may be leveled flush therewith. Fig. 4 shows this final stage of manufacture completed except that, for clarity, all reinforcement has been omited. After sufficient time has elapsed for proper curing, the slab-unit is ready for removal from its form F and for use.

It should be noted that the top element 23 may not be entirely uniform in thickness because the membrane 24, which serves as the principal bottom form therefor, usually will sag somewhat. However by using the aforementioned sag relievers 36 parallel to the side edge forming members 27, a quadratic support is provided for the membrane and the sag in each square area between supports will not be excessive. Moreover use of such secondary supports avoids the tendency, which otherwise would occur, of the membrane to pull out of end grooves and out of intermediate troughs when the material for the top element is poured thereover.

The foregoing description and the several views referred to therein have pertained to an embodiment of this invention that is a type of slab-unit suitable for use in curtain walls and partitions and in lightly loaded roof decks of short span. A second embodiment in a type more suitable for use in bearing walls and in roof and floor decks is illustrated in Figs. 13, 14 and 15. For this type of slab-unit, the trough members 40 and edge forming members 40a are of greater depth so that the top element 41 includes a stiffening rib 42 integral therewith at each trough point. Such stiffening ribs when properly reinforced serve as joists integral with the roof or floor slab or as columns integral with outer wall sheathing. If desired, such slab units may have continuous abutments across the slab ends to provide full bearing at supports.

The aforementioned Fig. 15 also illustrates a variation whereby insulative efficiency of slabs embodying this invention may be improved by minimizing direct contact between the two elements. It will be observed in this view that groove fillers 29a are used along slab sides in place of the previously described binder strips 29. Such groove fillers 29a may be similar to the type of trough filler designated 31a and are in short lengths so that side lip projections 30a will occur opposite abutment locations. While shown in conjunction with a slab-unit having stiffening ribs, this variation is also adaptable to slabs of minimum thickness and to end as well as to side edges.

A variation of slabs having stiffening ribs is shown in Fig. 16 in which trough binder strips 43 replace the previously described trough fillers 31 or 31a. Such strips of formed sheet metal bind the membrane 24 within the trough member 40 by transverse spring action and allow a maximum depth of stiffening rim 42, the latter including the bottom portion 32b thruout its length.

In these preferred embodiments of the invention, the edge forming and trough members, abutment forms and binder strips may be of the lightest weight sheet metal sufficing to serve their respective functions during the process of manufacture, since same may deteriorate by corrosion or otherwise without serious effect upon tightness of the interlock between slab elements. Basically this interlock is provided by the integral projections of the two elements, each with the other, and is independent of the intervening metal and membrane. The trough fillers and sag relievers likewise may be of impermanent materials since same function only until the material comprising the top element has set.

While this description refers generally to concrete as being the material of which the slab elements usually will be composed, obviously this invention applies also to slab-units formed of other materials such as gypsum, various plastics and the like.

One variation of this invention involves utilization of trough members 40 and edge forming members 40a as a means of increasing the structural strength of the slab-unit, in which case same may be of stronger, thicker metal and may be coated for protection against corrosion. In the latter connection it is noteworthy that such members are protected by the membrane 24 from any moisture that may penetrate the outer slab layer provided the latter is that heretofore designated as the top element 41.

Another variation, particularly adaptable to such structurally strengthened slab-units, is the replacement of abutments of the type described by providing downwardly projecting lugs attached to or formed with the trough and edge forming members, such lugs 44 to be embedded in the bottom element 21 as also shown in Fig. 16. Similarly, where trough members 26 and edge forming members are of minimum weight as previously described, abutments of the integral type 22 may be replaced by metal saddles, designated 45 in Fig. 17, shaped to fit the outside of such members and having a downwardly extended anchorage or base which is embedded in the bottom element 21 prior to hardening of the latter.

An alternative which is adapted principally to roof and floor slabs involves replacement of the continuous membrane by a stiff sheet, designated 46 in Fig. 18, interrupted at each trough point and resting upon shoulders formed at the top of trough members 47 and of corresponding edge forming members. Such sheets may be of impermanent material since same function solely as a form for the top element 41 during manufacture. Under this alternative, it also may be desirable that the bottom portion of trough members be slotted at each abutment location so that such abutments may have an appendage formed within the interior of such trough members to bond with those portions of the top element which will be in contact therewith.

An important variation is the alternative embodiment of this invention illustrated in Figs. 19 and 20 which involves the substitution of raised trough recesses formed of concrete integral with and on top of the bottom element in place of the previously described sheet metal trough members 26 and accompanying abutments or other means of attachment to the said bottom element. As shown in Fig. 19, this alternate actually substitutes pairs of continuous abutments 22a, using forms 48 for a raised portion above the normal top level of the bottom element 21 and a collapsible form 49 for forming a bulbous U-shaped trough recess in such raised portion. After concrete comprising the bottom element and such integral raised recess portions has set, and following removal of said forms thereafter, the membrane and trough fillers are installed in the manner previously described and the top element is poured. The completed slab-unit of this type is shown cross-sectionally in Fig. 20, except that reinforcement is not shown, this view corresponding to Fig. 4 of the preferred embodiment in that it is taken where a disk-like projection 32, integral with the top element 23, occupies the depressed interior of the membrane 24 within the said recess. In this alternate, edge forming members likewise may be replaced by continuous integral abutments parallel to ends and sides of the bottom element. Sag relievers 36 as previously described also may be replaced by concrete ribs integral with the bottom element and serving also to strengthen same altho at some sacrifice of insulative efficiency.

Several other alternatives and variations of this invention are possible. One possibly desirable variation, intended to further improve insulative characteristics of slab-units as originally described, is the insertion of spacers consisting of strips of multiply corrugated paper between the top surface of the bottom element and bottoms of the trough and edge forming members so that air-space intervenes between all appurtenances of the two elements excepting only where abutments occur and have direct contact.

While most of the slab-units shown in the several views in the accompanying drawings are shown with simple square edges along sides and ends thereof, it may be desirable in many cases to have specially shaped side or end edges or both and to have the membrane or the reinforcement or both project beyond slab edges to be available for lapping with that of adjacent slab-units. Thus it may be desirable to have "tongue and groove" edge joints between adjacent slab-units, one type thereof being shown in unit of Fig. 15, or that same be of "shiplap" type, of which Fig. 14 shows an example. In such slabs, the membrane should extend out to cover the inner face of the projecting tongue so that membranes of adjacent units will overlap and can be joined with mastic to insure a waterproof joint.

A special adaptation of such slab-units for curtain walls and partitions and for bearing walls in houses and in other lightly loaded structures is illustrated in Fig. 21, a horizontal section thru vertical joints between adjacent units. The vertical edges of these units have a central projecting tongue shaped to fit between flanges of a column of I-beam or H-section, such a column 51 being centered in a joint between aligned units with its flanges holding said units in alignment. A corner column 52, composed of two channels welded together, is also illustrated. The shoulder portions of slab edges may have reinforcement projecting therefrom to be lapped on the outside of column flange faces so that the gaps 53 between surfaces of adjacent slabs can be filled with mortar flush with such surfaces and thereby make same appear continuous. The slab-units shown in Fig. 21 differ from those previously described also in that edge lips and tongues 54 are formed integral with the "bottom element" 21 so that membranes 24 will occur near the outer surface of the wall, this being accomplished thru use of additional trough members 26 in place of the usual edge forming members.

Somewhat similar to the foregoing special adaptation is the adaptability of this invention to the type of construction described in my Patents Nos. 1,998,448 and 2,035,595 issued Apr. 23, 1935 and Mar. 31, 1936 respectively, wherein wall slabs are to be precast within a rectangular steel frame for use as wall panels. Reference to these patents will reveal that the present invention is ideal for use in conjunction therewith.

Slab-units of the types described herein may preferably be composed of concrete utilizing light weight aggregate such as Haydite, pumice or similar material, since this not only decreases the weight of such precast units and thereby facilitates handling, shipment and erection thereof but also results in better insulative characteristics than if made of concrete utilizing ordinary aggregates. Irrespective of the kind of aggregate employed, however, the described types of hollow slab-units provide heat and sound insulating values the equal of, or superior to, those of more complex types of building construction now in common use, such as solid slabs with furred plaster facing, hollow brick walls of two layers, hollow tile or block walls, concrete roof tile with furred plaster ceiling and the like.

It is likewise noteworthy, since the insulative effectiveness of the air-space comprising the hollow interior of the described slab-unit is little reduced by conduction thru solidly contacted connections between the two elements thereof, that this insulating value may be augmented by filling such interior space with a loose-fill or bulk insulating material and that same may be completely sealed within the completed slab-unit. When desired, this fill should be installed prior to placement of the membrane 24 and should fill the space between adjacent trough members 26 and between trough and edge forming members to the top thereof, in which case the described sag relievers 36 can be omitted.

It should be noted that this invention results in slabs of minimum weight for units of a given size and requires a minimum volume of concrete or similar material. Where structural or architectural considerations require slabs of some definite overall thickness, the depth of trough and edge forming members and consequently of the hollow interior air-space may be varied to give the required overall thickness of unit and still maintain the most economical thickness of surface layers, that is, of the flat portions of top and bottom elements. Similarly, the thickness of such surface layers may be varied to suit practically any loading requirement. On the other hand, minimum thickness of surface layers may be maintained and more severe loading requirements be satisfied by including the described stiffening ribs with one element or by reducing the spacing of interlock connections between the two elements. The latter spacing is variable in one direction by varying the spacing of trough members and in the other by varying the spacing of abutments along same. Thus, the flexibility of this invention permits design and manufacture of slab-units to suit exact requirements with maximum economy.

Summarizing other advantages of the invention, ease and economy of manufacture are fundamental and are vital for general practicability. Concerning slabs which embody the invention, the value of improved insulating qualities is greatest in connection with slabs used for roof decks and for exterior walls of either bearing or curtain type. That this invention offers improved insulation without attending increase in cost obviously constitutes a desirable feature. And that additional insulating material can be incorporated into the slab-unit and so avoid extra installation expense is likewise desirable.

The membrane feature also has its greatest value in connection with exterior wall usage. The positive guarantee of moistureproofness thereby afforded allows reduction of finish coatings to the minimum sufficing to provide the desired texture and color of wall finish. In some cases, this moistureproofness inherent in the slab-unit may even allow complete elimination of finish coating following erection.

Possibly the greatest advantage of the described slab-units, and the factor most responsible for their reduction of building costs, is the simplification effected where such slabs are used. Separate furring, lathing and plastering operations at building site are entirely eliminated. Application of separate layers of sheathing, building paper, insulating material and the like is combined into the single operation of slab installation. And due to the economy of material required for these slabs and their resulting lighter weight, such units can be of larger size than is now common. Thus installation of each unit may complete a greater area of wall or deck; in fact wall slabs may comprise complete panels of story height, some units including the necessary window or door frames shop installed therein. On the other hand, if units are of present size, their lighter weight results in faster installation. In either case, building operations are speeded and costs reduced because use of such slab-units entails fewer kinds of operations and fewer operations of the remaining kinds.

I claim:

1. A hollow slab-unit comprising two parallel surface elements, each element being a layer composed of cementitious material, said elements being spaced a substantial distance apart and connected by complementary lugs affixed to the opposed inner surfaces of said two elements, the faces of lugs pertaining to one element formed in interlocking engagement with and bearing laterally against faces of lugs pertaining to the other element, such interlocking lugs occurring in a plurality of spaced rows and the lugs pertaining to at least one element occurring intermittently along each such row, one element having additional projections positioned to bear laterally against projecting lugs of the other element substantially at right angles to bearing surfaces of said complementary lugs, the combined effect thereof preventing lateral shearing movement of one element with respect to the other element in any direction.

2. A slab-unit comprising two parallel surface elements, each element being a layer composed of cementitious material, said elements being connected by complementary lugs affixed to the opposed inner surfaces of said two elements, and a substantially continuous unbroken waterproof membrane intervening between said elements and likewise intervening between faces of lugs pertaining to each of said two elements, the faces of lugs pertaining to one element formed in interlocking engagement with and adapted to bear laterally against faces of lugs pertaining to the other element, the lateral bearing faces of certain lugs of one element being at right angles to lateral bearing faces of other lugs of said element, thereby preventing lateral shearing movement between the elements in any direction.

3. A hollow slab-unit comprising two parallel surface elements, each a layer composed of cementitious material, said elements being spaced a substantial distance apart, the interior surface of one element having a plurality of parallel pairs of outstanding legs affixed thereto, each pair with a recess intervening between such legs, the interior surface of the other element having a plurality of projecting legs integral therewith, each such integral projecting leg being formed within an opposed recess and filling same in rigid interlocking engagement, and a substantially continuous waterproof membrane interposed between said two elements and intervening between interlocking surfaces of the projecting legs of one element and recesses of the opposed element.

4. A hollow slab-unit comprising two parallel surface elements, each a layer composed of cementitious material, said elements being spaced a substantial distance apart, the interior surface of one element having a plurality of parallel pairs of outstanding legs affixed thereto, each pair with a recess intervening between such legs, the interior surface of the other element having a plurality of rows of intermittent projecting lugs integral with said element, each such integral projecting lug being formed within an opposed recess and filling same in rigid interlocking engagement, and a substantially continuous membrane interposed between said two elements and likewise intervening between interlocking surfaces of the projecting lugs of one element and recesses of the opposed element.

5. A hollow slab-unit comprising two parallel surface elements, each a layer composed of cementitious material, said elements being spaced a substantial distance apart, the interior surface of one element having a plurality of trough members spaced in parallel relationship along and extending substantially across such surface with means affixing such members to said element, such trough members being of bulbous U-shaped cross-section, the recess between outstanding legs of such members having a narrowed opening, and a substantially continuous membrane interposed between said two elements and extending between ends of opposed outstanding legs of adjacent trough members and depressed into the recessed interior of each such member with means for holding said membrane therein, such means intermittently filling a substantial portion of such recessed interiors, the opposed interior surface of the other element having a plurality of rows of integral projecting lugs formed within and filling unoccupied spaces within the interior of recesses of said trough members and rigidly interlocking therewith, the said membrane intervening between such interlocking contact.

6. A hollow slab-unit comprising two parallel surface elements, each a layer composed of cementitious material, said elements being spaced a substantial distance apart, the interior surface of one element having a plurality of parallel pairs of outstanding legs affixed thereto, each pair with a recess intervening between such legs, the interior surface of the other element having a plurality of projecting legs integral therewith and formed within and filling recesses of the opposed element so as to interlock therewith and resist shearing movement of the other element transverse to said parallel legs, the interior surfaces of said two elements likewise having overlapping projections along opposite edges and opposed so as to resist shearing movement of either element longitudinally along said parallel legs, and a substantially continuous membrane interposed between said two elements and intervening between all interlocking and bearing contacts between surfaces of said elements and of respective projections thereon.

7. A slab-unit comprising two spaced parallel surface elements, each element being a layer composed of cementitious material, the interior surface of one element having lips along portions of all four edges thereof, the interior surface of the other element having a plurality of projecting lugs formed in interlocking engagement with and bearing laterally against the inner faces of said edge lips, and a substantially continuous water-proof membrane interposed between said two elements and intervening between contacts of surfaces of said lips and lugs, the lateral bearing contact of lips and lugs along all four edges of said slab-unit preventing lateral shearing movement of one element with respect to the other element and the interlocking engagement thereof preventing separation of said elements.

8. In a method of precasting hollow slab-units in a horizontal position where the slab-unit consists of two spaced layers of cementitious material having interlocking internally projecting portions and with a continuous intervening membrane; the steps of forming a bottom surface layer of plastic cementitious material, affixing upon the upper surface of said bottom layer a plurality of pairs of upwardly projecting supports with each pair having an intervening recess, placing a membrane upon said supports whereby said membrane spans substantially horizontally between tops of near sides of adjacent pairs of supports and is depressed within said intervening recesses and anchored therein, and forming an upper surface layer of plastic cementitious material upon and over said membrane serving also as the bottom form therefor and causing said upper layer to fill space within said depressed portions of the membrane within said recesses and to interlock therewith, the said membrane intervening between such interlocking contact.

9. In a method of precasting hollow slab-units in a horizontal position where the slab-unit consists of two spaced layers of cementitious material having intermittent interlocking projecting portions and with a continuous intervening membrane; the steps of forming a bottom surface layer of plastic cementitious material, affixing upon the upper surface of said bottom layer a plurality of parallel pairs of upwardly projecting legs with each pair having an intervening recess, placing a membrane upon the said legs whereby said membrane spans substantially horizontally between tops of near legs of adjacent pairs and depressing said membrane into recesses intervening between legs of each pair, anchoring said membrane by installing a plurality of spaced fillers within the depressed membrane in each of said recesses, and forming an upper surface layer of plastic cementitious material and causing said upper layer to fill unoccupied spaces within the depressed membrane within said recesses and to interlock therewith, the said membrane intervening between such interlocking contact.

10. In a method of precasting hollow slab-units in a horizontal position where the slab-unit consists of two spaced layers of cementitious material having interlocking internally projecting appurtenances and with a continuous intervening water-proof membrane; the steps of forming a bottom surface layer of plastic cementitious material, placing a plurality of spaced parallel trough members substantially to rest upon the top of said bottom layer whereby an interior recess of each such member has a narrowed opening uppermost, affixing said members to said bottom layer while same remains still plastic, placing a membrane upon said members whereby said membrane spans substantially horizontally between tops of near sides of adjacent trough members and is depressed into the interior recess of each such member and anchored therein, and forming a top surface layer of plastic cementitious material upon and over said membrane as a form and causing said top layer to have integral downwardly projecting portions within the depressed membrane within the interior recess of each of said members, thereby interlocking said top layer to said members which are in turn affixed to said bottom layer, the said membrane intervening between such interlocking contact.

11. In a method of precasting hollow slab-units in a horizontal position where the slab-unit consists of two spaced layers of cemetitious material having interlocking internally projecting appurtenances and with a continuous intervening waterproof membrane; the steps of forming a bottom surface layer of plastic cementitious material, placing a plurality of spaced parallel trough members substantially to rest upon the top of said bottom layer whereby an interior recess of each such member has a narrowed opening uppermost, affixing said members to said bottom layer by adding pairs of abutments on the top surface of said bottom layer, making such abutments integral therewith while same remains still plastic, the opposed abutments of each such pair gripping a trough member centered between same, and securing said member to said bottom layer, placing a membrane upon said members whereby said membrane spans substantially horizontally between tops of near sides of adjacent trough members and is depressed into the interior recess of each such member and anchored therein, and forming a top surface layer of plastic cementitious material upon and over said membrane as a form and causing said top layer to have integral downwardly projecting portions within the depressed membrane within the interior recess of each of said members at points where pairs of opposed abutments occur, thereby interlocking said top layer to said bottom layer, the said membrane and said members intervening between such interlocking contacts.

12. In a method of precasting hollow slab-units in a horizontal position where the slab-unit consists of two spaced layers of cementitious material with an intervening membrane; the steps of forming a bottom surface layer of plastic cementitious material, affixing upwardly projecting supports upon the upper surface of said bottom layer parallel to and near all four edges thereof, placing a membrane upon said supports whereby said membrane spans substantially horizontally between tops of said supports, forming an upper surface layer of plastic cementitious material directly upon and over said membrane and enclosing the hollow interior of said slab-unit, and causing said upper layer to have integral downstanding lips alongside said supports and interlocking therewith.

FRANCIS MALCOLM CROWE.